3,420,883
N-ALKYL-N-CARBAMYLALKYL
ISOPICRAMIC ACIDS
Jerzy Jozef Bartoszewicz, Twickenham, Middlesex, England, assignor to Lever Brothers Company, New York, N.Y., a corporation of Maine
No Drawing. Filed Nov. 25, 1964, Ser. No. 413,986
Claims priority, application Great Britain, Nov. 26, 1963, 46,699/63
U.S. Cl. 260—559    3 Claims
Int. Cl. C07d 87/42; C07c 103/30; A61k 7/12

ABSTRACT OF THE DISCLOSURE

This disclosure is concerned with certain N-alkyl-N-carbamyl-alkyl-isopicramic acid compounds for dyeing keratinous fibres. This disclosure is also concerned with compositions containing these compounds.

---

This invention relates to dyes for keratinous fibres such as hair and fur. It also relates to compositions for dyeing keratinous fibres comprising such dyes and to processes for dyeing keratinous fibres using such compositions.

The new dyes of the present invention are compounds of the general formula

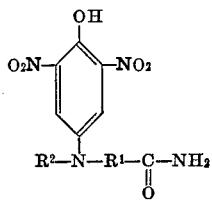

where $R^1$ is an alkylene group having up to 3 carbon atoms;
$R^2$ is an alkyl or hydroxyalkyl group having up to 3 carbon atoms, or the group —$R^1$—CO·$NH_2$;

and salts thereof. Preferably the salts are alkali or alkaline-earth metal salts or ammonium or substituted-ammonium salts.

Examples of substituted-ammonium salts are ammonium salts in which one or more of the hydrogen atoms of the ammonium radical is substituted by an alkyl group having up to 6 carbon atoms or by a hydroxyalkyl group having up to 4 carbon atoms or in which two hydrogen atoms of the ammonium radical are substituted by a group which forms with the nitrogen atom a heterocyclic ring.

As specific examples of metal salts are mentioned the sodium, potassium and calcium salts. As specific examples of substituted-ammonium salts are mentioned the mono-, di-, and tri-ethanolamine or -isopropanolamine, mono-, di-, and tri-methylamine, -ethylamine, -isobutylamine and morpholine salts. Salts derived from other amines or basic nitrogen-containing compounds may also be employed.

The above dyes of the invention colour hair a violet shade (which is rare for a nitro dye) and can be used, for example, in the formulation of blonde, brown and grey hair colourants. The dyes of the invention are of particular value in the formulation of medium and dark brown hair colourants.

The preferred dyes of the invention are N-methyl-N-carbamylmethyl-isopicramic acid and its alkali metal, alkaline-earth metal, ammonium and substituted-ammonium salts.

The invention also provides a composition for dyeing keratinous fibres, especially living hair, comprising a dye of the invention in aqueous solution. The pH of the solution of the dye may vary over a wide range but will usually be in the range pH 2 to 12. It is preferable to apply the dyes to living hair from solutions having a pH of less than 9 since the uptake by the hair of the dyes is greater at the lower pH's and at the same time the hair is left in a better condition. Furthermore, solutions of pH above 9 tend to shorten the life of permanent waves.

The dyes of the invention may be used with other suitable nitro dyes to produce blonde, brown and grey shades. When the violet dyes of the invention are used in conjunction with a yellow dye as in, for example, the formulation of a composition for producing brown or blonde shades, the yellow dye is preferably 2-nitro-N-methyl-N-acetyl-p-aminophenol or a salt thereof or N-methyl-N-acetyl-isopicramic acid or a salt thereof, preferably an alkali metal, alkaline-earth metal, ammonium or substituted ammonium salt thereof. Compositions containing the violet dyes of the invention and these yellow dyes preferably have a pH in the range 6.5 to 7.5.

The violet dyes of the invention are also advantageously used with blue-violet to violet dyes being compounds having the general formula

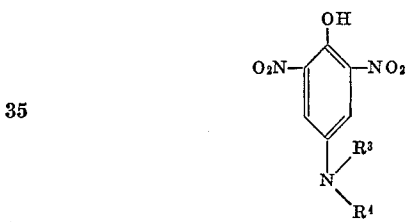

where $R^3$ is an alkyl group or a hydroxyalkyl group having up to 4 carbon atoms; and
$R^4$ is a hydroxyalkyl group having up to 4 carbon atoms;

or salts thereof. Again, the preferred salts are the alkali and alkaline-earth metal salts and ammonium and substituted-ammonium salts.

Since these yellow dyes and blue-violet to violet dyes have similar chemical structures to the violet dyes of the invention, combinations of them possess useful properties. For instance, selectivity on certain hairs is minimised and also the fastness of the colour of the dyed fibre is good. The combinations also have good stability on storage of the composition.

When formulating dyeing compositions comprising the dyes of the invention in their salt form, the salt may be added as such or it may be formed in situ by including in the formulation the acid form of the dye and the appropriate base.

The invention further provides a process of dyeing keratinous fibres using the above-mentioned compositions.

Dyes according to the invention can be prepared as illustrated in the following Example 1.

EXAMPLE 1

Preparation of N-methyl-N-carbamyl-methyl-isopicramic acid ammonium salt

A 500 ml. three-necked flask equipped with an automatic stirrer and attached to an iso-mantle and condenser was used. 30 g. of chloroacetamide were added to 300 ml. of water containing 12 ml. of glacial acetic acid and stirred until a clear solution was obtained at 48–50° C. 30 g. of the ammonium salt of N-methyl-isopicramic acid were then added. After stirring for a short time, 19.2 g. of potassium hydroxide dissolved in 45 ml. of water were added dropwise over a period of 10 minutes. The temperature was then gradually raised over a period of 20 minutes until the mixture refluxed at 101° C. After refluxing for 25 minutes the flask was cooled externally until the temperature had dropped to 65° C. A further addition of 15 g. of chloroacetamide and 6 ml. of glacial acetic acid was then made. After stirring for a few minutes at 65–70° C., 9.6 g. of potassium hydroxide dissolved in 22 ml. of water were added dropwise over a period of 5 minutes. The temperature was then gradually increased over a period of 15 minutes and the mixture refluxed for 25 minutes more. The mixture was then poured into 1200 ml. of cold water. The addition of 22 ml. of concentrated hydrochloric acid was then made to make the solution acid to Congo red paper. The solution was cooled from 40° to 32° C. and fine reddish-brown needles of N-methyl-N-carbamyl-methyl-isopicramic acid crystallised out. On filtration, 30 g. of moist dyestuff cake were obtained.

The ammonium salt of N-methyl-N-carbamyl-methyl-isopicramic acid was produced as follows. The filter cake of N-methyl-N-carbamyl-methyl-isopicramic acid obtained above was mixed to a smooth paste with a solution of 1 volume of ammonia (specific gravity 0.88) in 2 volumes of methyl alcohol. The dyestuff paste was then dried at 50–60° C. in a vacuum oven at reduced pressure (60–70 cm. Hg) and ground in a mortar. The yield of N-methyl-N-carbamyl-methyl-isopicramic acid ammonium salt was 24.0 g. On recrystallisation from boiling water the pure dyestuff was obtained in the form of fine brown crystals with an olive lustre having a melting point of 184–186° C.

The corresponding alkali metal, alkaline-earth metal and substituted-ammonium salts are readily prepared in a similar manner by neutralising the N-methyl-N-carbamyl-methyl-isopicramic acid with, for example, sodium or potassium hydroxide, calcium carbonate, diisobutyl-amine, mono-, di- or tri-ethanolamine or morpholine. The morpholine salt was obtained, on recrystallisation from water, in the form of granular, black-violet, dull crystals which melted, with decomposition, at 171°–173° C. The diethanolamine salt was obtained in the form of brown prisms with an olive lustre melting at 155°–157° C. The monoethanolamine salt was obtained on recrystallisation as dull, fine, violet-black, crystalline aggregates which had a melting point of 152°–154° C.

Compounds having a hydroxyalkyl group attached to the amino nitrogen atom can also be prepared in a like manner to that described above but starting from, for example, a salt of N-(2-hydroxyethyl)-isopicramic acid instead of N-methyl-isopicramic acid.

Salts of N,N-di-carbamyl-methyl-isopicramic acid may be prepared as described in the above example by starting from the ammonium salt of isopicramic acid instead of from the salt of N-methyl-isopicramic acid.

Dyes having a N-ethyl or N-propyl group instead of a N-methyl group may be obtained, as described above by employing as starting material the ammonium salt of N-ethyl- or N-propyl-isopicramic acid instead of the ammonium salt of N-methyl-isopicramic acid.

Furthermore, compounds having a N-carbamyl-ethyl or N-carbamyl-propyl group instead of a N-carbamyl-methyl group may be obtained by employing chloro-propionamide or chloro-butyramide instead of chloro-acetamide.

The N-methyl-N-carbamyl-methyl-isopicramic acid obtained as described above, on recrystallisation from boiling water gave the pure dyestuff in the form of fine, lustrous, brownish-violet needles of melting point 187°–189° C.

The invention is further illustrated by the following Examples 2 to 6 of compositions for dyeing hair. In these examples the percentages are percentages by weight.

| | Examples (percent) | | | | |
|---|---|---|---|---|---|
| | 2 | 3 | 4 | 5 | 6 |
| Ammonium salt of N,N-di-(2-hydroxyethyl)-isopicramic acid | 0.35 | 1.00 | 1.20 | 1.5000 | |
| N,N di(2-hydroxyethyl)-isopicramic acid | | | | | 1.20 |
| Ammonium salt of N-methyl-N-carbamyl-methyl-isopicramic acid | 0.10 | 0.12 | 0.15 | 0.1875 | |
| N-methyl-N-carbamyl-methyl-isopicramic acid | | | | | 0.60 |
| N-methyl-N-acetyl-isopicramic acid | 0.40 | 0.25 | 0.30 | 0.3750 | 0.50 |
| N-methyl-N-acetyl-2-nitro-para-aminophenol | | 0.50 | 0.60 | 0.7500 | 0.50 |
| 1-di-(beta-hydroxyethyl)-amino-2-amino-4-nitro-benzene | | | | | 0.32 |
| 1-(beta-hydroxyethyl)-amino-2-nitro-4-di-(beta-hydroxyethyl)-amino-benzene | | | | | 0.35 |
| 2,4-diamino-5-nitro-toluene | | | | | 0.03 |
| Duranol Navy Blue BN (cellulose acetate disperse dyestuff) | | | | | 1.00 |
| Formamide | 5.00 | 5.00 | 5.00 | 5.0000 | 6.00 |
| Lauryl polyethylene glycol [$C_{12}H_{25}O(C_2H_4O)_{14}H$] | 5.00 | 5.00 | 5.00 | 5.0000 | 5.00 |
| Morpholine | | | | | 0.85 |
| Perfume | 0.50 | 0.50 | 0.50 | 0.5000 | 0.50 |
| Thickener [Carbopol 934 (a 2% w/w aqueous dispersion of a carboxylic-substituted vinyl polymer neutralised with potassium hydroxide)] | 30.00 | 36.00 | 42.00 | 45.0000 | 53.00 |
| Water | | | to 100 | | |

The following procedure was adopted in preparing the above compositions. The dyestuffs, formamide, lauryl polyethylene glycol and water and, in the case of Example 6 the morpholine, were mixed and heated to 70°–75° C. A 2% w./w. aqueous dispersion of Carbopol 934 was partly neutralised with 5 N potassium hydroxide to a pH of 7.0 to 7.5 and perfume mixed in. The mixture containing the dyestuffs was then stirred slowly into the Carbopol 934 paste and stirring continued until a homogeneous paste was obtained. Where necessary the pH of the paste was adjusted to 6.5 to 7.0 by the addition of 10% lactic acid or 10% monoethanolamine.

The above compositions gave (on heads with 30–70% white hair) natural shades with acceptable fastness to shampooing, light and perspiration. They also had acceptable fastness properties on permanently waved hair and were free from scalp staining and had a good conditioning effect on the hair. Example 2 gave a golden blonde shade;

Example 3 a light brown shade; Example 4 a medium brown shade; Example 5 a dark brown shade; and Example 6 a darker brown shade.

As a result of salon tests, a pH of 6.5 to 7.0 was found to be the optimum value for the colour uptake and for imparting a good conditioning effect to the hair. A viscosity of 400 to 800 centipoises gave the best results in colour uptake and permitted the easiest application.

The compositions can be applied with a sponge or brush or from an applicator to either dry or previously shampooed and towel-dried hair.

What is claimed is:

1. A compound of the formula:

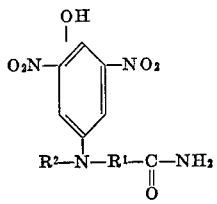

where $R^1$ is an alkylene group having up to 3 carbon atoms; $R^2$ is a group selected from the class consisting of alkyl and hydroxyalkyl groups having up to 3 carbon atoms and the group —$R^1$—CO—$NH_2$ or salts thereof selected from the group consisting of the alkali metal, alkaline-earth metal, ammonium, and amine addition salts.

2. A compound which is N-methyl-N-carbamyl-methyl-isopicramic acid.

3. A compound which is N-methyl-N-carbamyl-methyl-isopicramic acid or a salt thereof selected from the class consisting of sodium, potassium, calcium, ammonium, monoethanolamine, diethanolamine, triethanolamine, monoisopropanolamine, diisopropanolamine, triisopropanolamine, monomethylamine, dimethylamine, trimethylamine, monoethylamine, diethylamine, triethylamine, monoisobutylamine, diisobutylamine, triisobutylamine and morpholine salts.

References Cited

Chemical Abstracts, vol. 53, p. 18405g (1959).

NICHOLAS S. RIZZO, *Primary Examiner.*

JOSE TOVAR, *Assistant Examiner.*

U.S. Cl. X.R.

8—10.1, 11; 260—247.2